United States Patent
Liu

(10) Patent No.: US 9,665,914 B2
(45) Date of Patent: May 30, 2017

(54) SOCIAL CAMPAIGN NETWORK AND METHOD FOR DYNAMIC CONTENT DELIVERY IN SAME

(71) Applicant: Cybeye, Inc., Torrance, CA (US)

(72) Inventor: Bing Liu, Rolling Hills, CA (US)

(73) Assignee: Cybeye, Inc., Torrance, CA (US)

( * ) Notice: Subject to any disclaimer, the term of this patent is extended or adjusted under 35 U.S.C. 154(b) by 432 days.

(21) Appl. No.: 14/215,153

(22) Filed: Mar. 17, 2014

(65) Prior Publication Data
US 2014/0279624 A1    Sep. 18, 2014

Related U.S. Application Data

(60) Provisional application No. 61/787,821, filed on Mar. 15, 2013.

(51) Int. Cl.
   *G06Q 50/00* (2012.01)
   *G06Q 10/06* (2012.01)
(52) U.S. Cl.
   CPC ......... *G06Q 50/01* (2013.01); *G06Q 10/063* (2013.01)

(58) Field of Classification Search
   CPC ..... G06Q 50/01; G06Q 30/02; G06Q 30/0277
   See application file for complete search history.

(56) References Cited

U.S. PATENT DOCUMENTS

2006/0212930 A1*  9/2006  Shull ................. G06F 21/55
                                                                726/10
2010/0274815 A1* 10/2010  Vanasco ........... G06F 17/30867
                                                                707/798

* cited by examiner

*Primary Examiner* — Maroun Kanaan
(74) *Attorney, Agent, or Firm* — Dilworth Paxson LLP; Edward F. Behm, Jr.

(57) ABSTRACT

An engine, system and method for a domain social network that interconnects Internet users with at least domains owned by or of interest to those Internet users, and that may obtain and/or forward obtained dynamic data regarding those domains automatically, such as by web service or email service. The dynamic data may be used to filter and protect content and data of the respective domains, to protect users by identifying low quality web pages or malicious software or pages, to isolate or improve search results regarding the domain, and/or to improve Internet-based transaction flow, such as the creation of advertising.

7 Claims, 10 Drawing Sheets

SOCIAL CAMPAIGN NETWORK AND METHOD FOR DYNAMIC CONTENT DELIVERY IN SAME

CROSS-REFERENCE TO RELATED APPLICATIONS

This application claim priority to U.S. Provisional Patent Application No. 61/787,821, filed Mar. 15, 2013, entitled Social Campaign Network and Method for Dynamic Content Delivery in Same, the entirety of which is incorporated by reference herein as if set forth in the entirety.

FIELD OF THE INVENTION

The present invention relates to data tracked and provided in relation to Internet browsing, and, more particularly, to an engine, system and method of providing a domain social network having business intelligence logic.

BACKGROUND OF THE INVENTION

The term "Web 2.0" is commonly associated with web applications that facilitate interactive information sharing, interoperability, user-centered design, and collaboration on the World Wide Web (WWW, also referred to hereinafter as the Internet or a network, further includes intranet, extranet, and the like). Web 2.0 thus necessarily includes aspects of connecting non-virtual identity to virtual identity on the WWW using a data feed comprised of data relationships and business and data intelligence. As used hereinthroughout, and unless otherwise noted, the term "identity" is defined to include non-virtual and/or virtual aspects of a person interacting on, with, or with others on, the WWW.

In an example of a typical social network, Facebook® connects an identity with other persons based on, for example, friendship. Further, persons using a social network platform such as the Facebook platform may generate activities, events, and the like, as indicated from the respective Facebook account associated with each respective identity. Once generated, the Facebook platform may automatically feed friends' activities, events, and the like to third person friends of the identity, such as when such activities or events are occurring or have occurred.

However, Facebook connects persons to persons, or persons/entities (such as businesses) to person/entities. Facebook does not provide any interconnection for domains associated with those persons or entities. Thus, in typical social environments such as Facebook, persons/entities generate and receive the data. That is, the Facebook platform feeds data to and from the friends identified as being associated with each identity. Needless to say, data generated in this way, and absent data monitoring regarding domain names associated with the persons/entities on Facebook, severely limits the usefulness of the data generated by such typical social sites—particularly for advertising purposes, for example.

Further, there are over 200 million domains as of 2010, and over 1.8 billion web users. These users are running approximately 15 billion web searches a year, which leads each user to 2-3 unknown websites per day, on average. Such websites, if unknown to the user and without any way for the user to have a trusted party (such as a social network friend, or a trusted domain) that indicates the acceptability of the unknown site, may pose a risk to users, such as an increased likelihood of phishing or providing malware.

Thus, there is a need for a "domain social network" that interconnects data regarding identities (i.e., persons/entities) to data regarding domains. More particularly, there is a need for an engine, system and method to generate domain data using, and that itself provides business intelligence logic, wherein data is related, such as for sales, advertising or trustworthiness, purposes, to an identity's activity.

SUMMARY

The present invention provides an engine, system and method for a domain social network that interconnects Internet users with at least domains owned by or of interest to those Internet users, and that may obtain and/or forward obtained dynamic data regarding those domains automatically, such as by web service or email service. The dynamic data may be used to filter and protect content and data of the respective domains, to protect users by identifying low quality web pages or malicious software or pages, to isolate or improve search results regarding the domain, and/or to improve Internet-based transaction flow, such as the creation of advertising.

It is to be understood that both the foregoing general description and the following detailed description are exemplary and explanatory, and are intended to provide further explanation of the invention as discussed hereinthroughout.

BRIEF DESCRIPTION OF THE DRAWINGS

The accompanying drawings are included to provide a further understanding of the disclosed embodiments. In the drawings:

FIG. 5 is an illustration of aspects of the present invention;

FIG. 6 is an illustration of aspects of the present invention;

FIG. 7 is an illustration of aspects of the present invention;

DETAILED DESCRIPTION

A computer-implemented platform and methods of use are disclosed that provide networked access to a plurality of types of digital content, including but not limited to video, audio, and document content, and that track and deliver the accessed content. Described embodiments are intended to be exemplary and not limiting. As such, it is contemplated that the herein described systems and methods can be adapted to provide many types of users with access and delivery of many types of domain data, and can be extended to provide enhancements and/or additions to the exemplary services described. The invention is intended to include all such extensions. Reference will now be made in detail to various exemplary and illustrative embodiments of the present invention.

Figure 1:
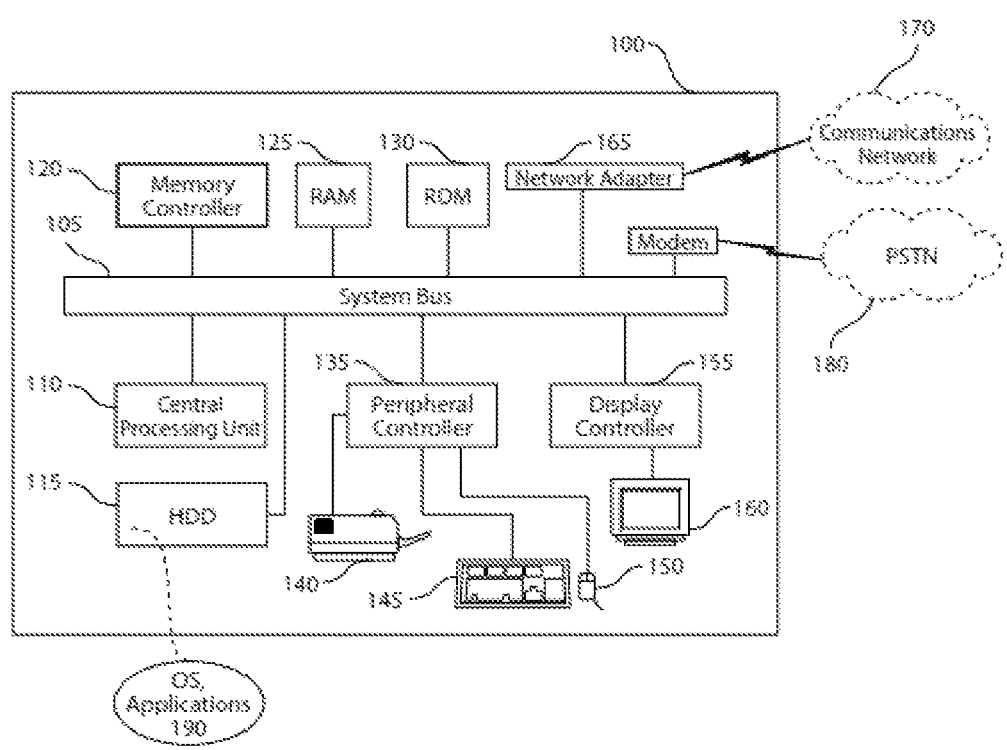
FIG. 1 is a block diagram of an exemplary computing system for use in accordance with herein described systems and methods.

FIG. 1 depicts an exemplary computing system 100 that can be used in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
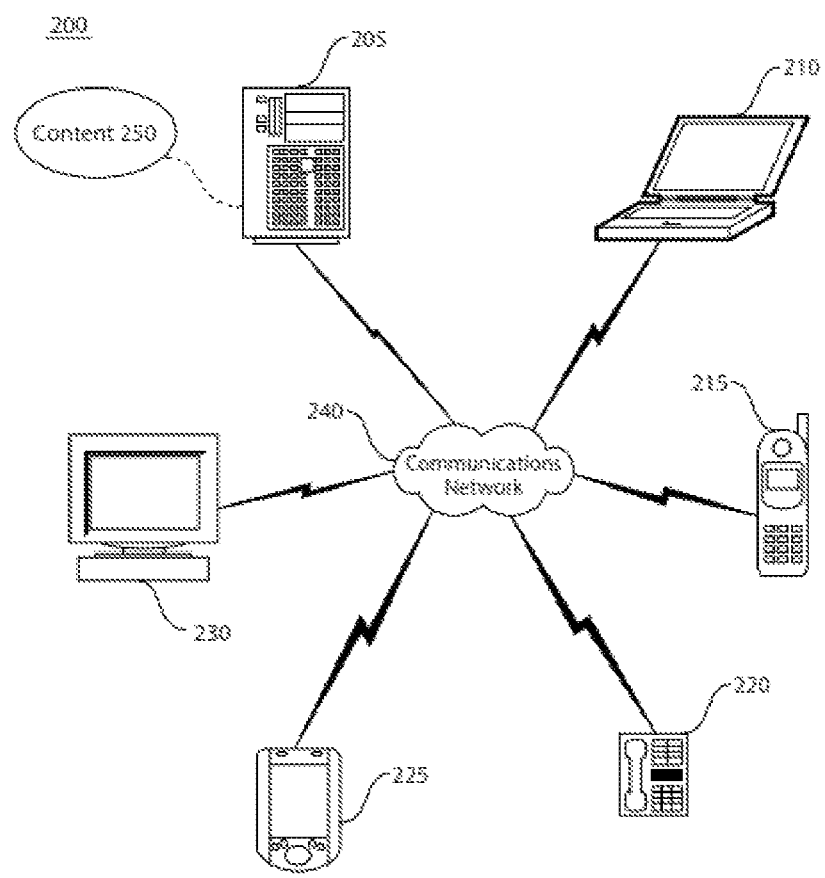
FIG. 2 is a block diagram showing an exemplary networked computing environment for use in accordance with herein described systems and methods.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

As used herein, the term "domain social network" is defined to include any connecting of a non-virtual, or virtual, identity with an Internet domain, such as based on ownership of or interests reflected on the domain on a network 240. More particularly, a domain social network may automatically feed domain data regarding the domains followed by each of the afore-discussed identities, such as domain data regarding available social media activities or events of likely interest to each of the identities based on the followed domain(s), such as via web service or email service, to the identities who follow those domains on a front end, and to the domains that are followed on a back end. The domain information, social media activities and performance events related to the domain(s) followed by a particular identity may further generate business intelligence as to the interests of that identity.

An Internet domain typically represents an identity, such as of a business, as well as the branding and reputation of that business. As such, a domain name constitutes a business asset. In some cases, reliance or trust placed in the brand associated with the domain name asset may be used maliciously, such as by hackers or others who use that trust to spread spam or viruses on the Internet.

Therefore, domain name owners need to protect and cultivate the use of their respective brands. In part, this cultivation necessitates that domain owners know the social media data and website performance data regarding the owned domain(s), as well as that of competitive domains or related domains. It is highly desirable to know this social media data and website performance data about domains of interest before making any judgment, or entering into any engagement, such as for advertising. Gaining this knowledge in advance regarding oneself, ones' competitors, and Internet third parties prior to entering into web-based engagements, is good Internet "citizenship," at least in that learning about domains and domain-related data before that data is used or shared with others helps stem the spread of bad web pages, malicious software and viruses, spam, and the like, to users who have placed their respective trust in particular domains.

Search engines and user-generated content platforms, such as Facebook or Twitter, could use domain-related data, if available, to value a domain, or an identity associated with a domain to filter and protect its content, data and users, such as in avoiding malicious or low quality content, and for advertiser's purposes. However, prior to the advent of the present invention and its domain social network, search engines and user-generated content platforms did not have access to such data. Rather, if such data was desired, one had to search for third party data tracking entities, and open one's site to allow such entity to track, piece-by-piece, the domain information desired. Thereafter, such data would have to be manually searched in order to make use of it, and this manual search would need to be repeated for each domain owned or in which there was interest.

The present invention provides an engine, system and method for a domain social network that interconnects Internet users with at least domains owned or interested by those Internet users, and that may obtain and/or forward the dynamic data automatically, such as by web service or email service. The dynamic data may be used to filter and protect content and data of the respective domains, to protect users by identifying low quality web pages or malicious software or pages, to isolate or improve search results regarding the domain, and/or to improve Internet-based deal flow, such as advertising.

Figure 3:
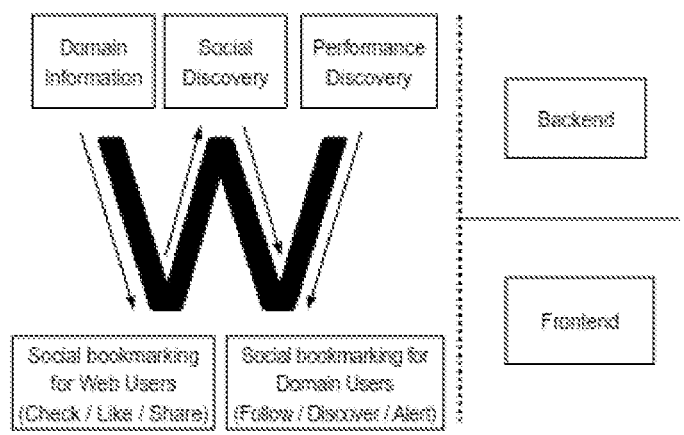
FIG. 3 is an illustration of aspects of the present invention.

In order to provide this engine, system and method, the present invention may include a front end engine and a back end engine, as illustrated in FIG. 3. Each of the backend engine and the front end engine may be or include, as discussed hereinabove with respect to FIGS. 1 and 2, at least one microprocessor, such as within a server, and at least one access node to at least one network, such as the Internet.

The backend engine, which may take the exemplary format illustrated in FIG. 3, for example, may automatically crawl and collect publicly available domain information, and may use that data to calculate a domain valuation (such as using a formula included in the aspects of the present invention) based on, for example, website traffic, number of followers/favorites markers, searchable page numbers and domain age.

The backend may also, for example, analyze a domain's "adult attribute," such as based on the domain link outs, keywords and the known adult attributes for certain domains. The backend may further compile domain-competitor data. The accumulated domain information may be generated, for example, as domain report data accessible to users. The access to this domain report data may be exposed, for example, by a browser bookmarklet, a browser add-on, or a domain social network website (hereinafter collectively "bookmarklet") that may provide a thin-client interface to reporting. Access may further include a vendor feed, such as via an application programming interface (API).

The domain social network bookmarklet may thus be, graphically, a front-end feature that is an add-on to any web browser. As such, it may be downloaded, or dragged and dropped or added via a favorites bar without a software download. In short, the bookmarklet may allow for "social bookmarking," that is, sharing of bookmarks with others, and indicating to domain owners whether a user has bookmarked the owned domain (such as for marketing/sales purposes).

The bookmarklet may give the user peace of mind for an unknown website (such as by giving linkouts, keywords, and website physical location, for example), or may allow a user to follow a known domain (such as by indicating the domain, giving an option to follow, providing keywords, and providing competitors, for example), at the user's direction and upon production by the browser, for example. All such information may, of course, be accumulated by the back end for production by the bookmarklet front end.

Further, the providing of the bookmarklet may greatly enhance page views, and thus my contribute to, and allow the provider of the bookmarklet to obtain a share of, enhanced advertising revenue. For example, if the user requests the bookmarklet, such as by clicking "Track" on any given web page, the user may be enabled to "Check" the site (to return or receive information from), "Like" the site (which will bring friends to the site), or "Share" the site (which will invite friends to the site), based on the information provided in the bookmarklet. This increased traffic to the site will provide increased ad revenue correspondent thereto.

More particularly, and by way of non-limiting example, via the bookmarklet any Internet user may access the domain information from the backend engine, such as by viewing any web page providing a "Check," as discussed hereinthroughout. The Internet user may, by way of non-limiting example, indicate a "Like," a "Share," or a "Follow" action, such as to save any web page, share any web page to third party, and/or to follow the indicated domain in the domain social network.

The Check process may also trigger the backend engine to perform business intelligence social discovery and performance discovery, as discussed hereinthroughout. An increase in the number of users may thereby generate more discovery data and more domain information, thus increasing the safety, knowledge, and hence enjoyment of all Internet users, while additionally improving web-based economic transactions, such as advertising. Yet more particularly, the backend may generate social discovery data and performance data based on a data request, such as, by way of non-limiting example, by way of a "Discover."

A user may, such as via the front end, join the domain social network, and such joinder may include definition of the relationship with owned or interested domains. This may, by way of non-limiting example, be termed a "Follow." Further, to increase the convenience of a "Follow," a group name or tag may be assigned to followed domains.

Figure 4:
FIG. 4 is an illustration of aspects of the present invention.
Figure 8:
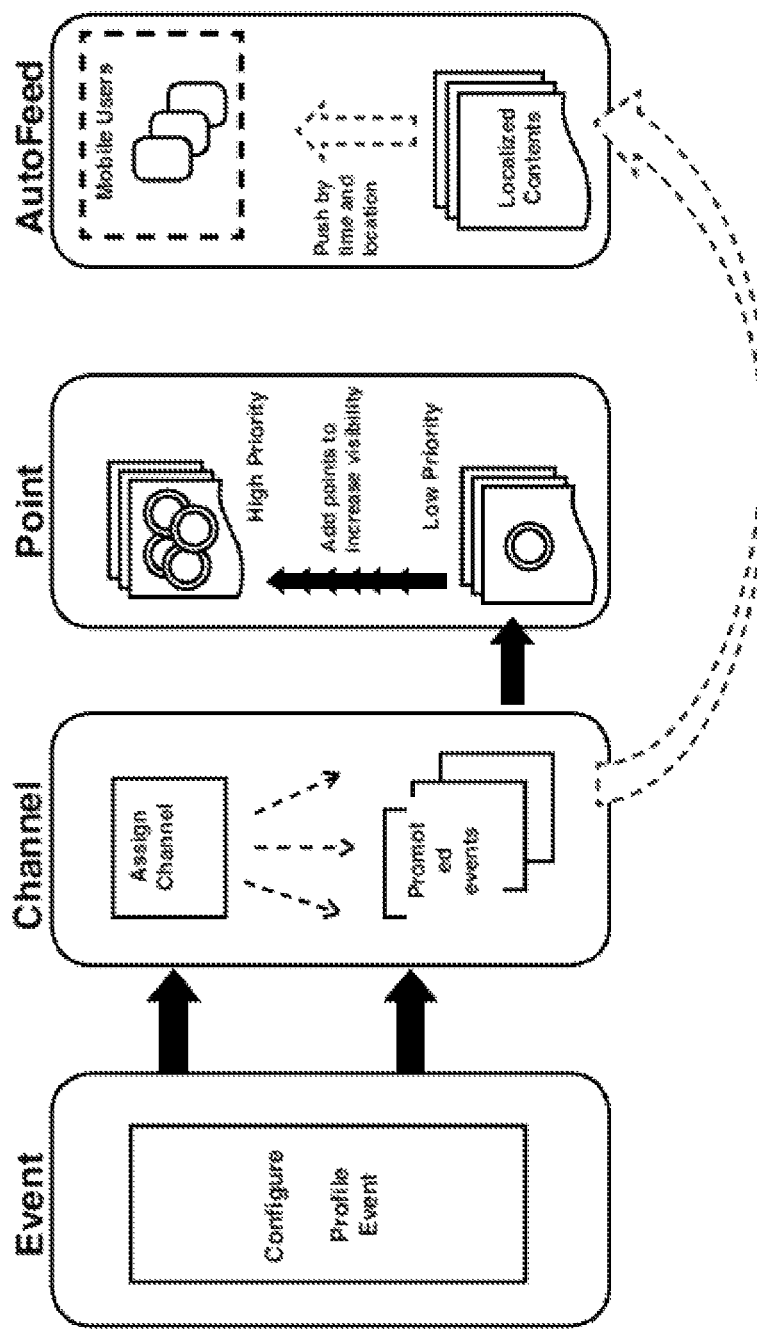
FIG. 8 is an illustration of aspects of the present invention.

As more particularly illustrated in FIG. 4, the backend system may generate domain information which may include valuation data and adult attribute data, and provide such information to the frontend. This information may be accessible by the user through the use of, for example, the aforementioned browser add-on, bookmarklet, website service, email service or phone service, such as by allowing certain aspects of the domain information to be presented to the user. A user may also become a member of the domain social network so as to follow particular domains of interest, for example.

Thus, in a manner similar to that discussed herein for tracked sites, the front end bookmarklet may provide, either to a surfing user or a domain owner, critical information regarding the health of the domain. Users employing this feature may allow registered users to follow any domain for its website information, ranking, competitive analysis, and performance tracking, as well as for social discoveries about its domains. Again, information regarding these factors is accumulated by the backend of the present invention, and provided to the front end.

As further illustrated in FIG. 4, the user may thereby be presented with metrics relevant to the URL being visited or to be potentially viewed. In addition to tagging the URL in accordance with specific user preferences, the user may be provided information regarding the title of the website, the amount of traffic to the website in a given period of time, a summary correspondent to the content of the website, related or competitive websites to the one of interest, a listing of websites which a referenced or "link out" from the site of interest, and the website origination location, for example.

The backend system further has discovery capabilities, such as for social discovery and performance discovery. Accumulated domain information and discovery data may feed to domain social network members automatically, such as by web service, email service or phone service. Domain information data may further feed to third parties by API.

The backend may collect each domain's identity information, traffic information, link outs, link ins, following or favorites marking, and adult attribute data, and may therefrom calculate domain valuation based on traffic data, searchable page data and domain age data. For example, domain age (based on year number) may be a weighted factor in the valuation. Domain age of less than one year may be weighted at less than 1.0, wherein a lower valuation represents a lower popularity. For example, a domain age of less than a certain period, such as three months, may be particularly risky for Internet users. As such, a website having a lower valuation that requests user information may pose a particular risk to the user. If that web page provides a majority of its linkouts to a targeted website, then the risk to the user that the page is a phishing or scam page for the target website is even higher. When such high risk web pages are detected, the alert data of that high risk may be sent to the domain owner of the targeted website if it joins domain social network. Likewise, individual users may be informed of the high risk of the web page.

A user may login to the domain social network to check the alert data at anytime, for example. Alternatively, the alert data may be batch updated, such as daily. The user may check alert data for a specific domain, or may group several domains together and check alert data for that group. For example, a web message (such as a Tweet®) may include a web page link to a domain having a very new domain age, or an adult tag, or a low domain valuation, this data indicated by the performance discovery, and/or indicated by an alert, may preclude addition of this domain to search engine results, such as to avoid mass spread of a potentially harmful web page across Internet users.

This "performance discovery" may be executed from at least one cloud computing platform, such as in multiple regions. Periodically, such as once an hour, the backends from multiple regions may read the most popular pages from a domain to calculate its loading time and page size. The down time of specific web pages may also be calculated. For example, in an embodiment of performance discovery, web page size data may be read, and if it is similar to a previous checkup, a quick loading time calculation may indicate acceptable performance without reading the full web page data. This may significantly reduce bandwidth usage but nevertheless maintain reliable checkups. In another embodiment of performance discovery, if a domain report has not been used by any users for a period of time (thus indicating that the domain is not popular), the loading time checkup may continuously use the aforementioned quick loading time checkup, such as by reading only the header data of the web page and calculating loading time or down time.

A user who joins the domain social network of the present invention may use an email address for identification and for completing the validation process. User IDs may also be incorporated from other social networks approved by the user and/or associated with the identified email address, for example. As would be known to those skilled in the art, third party social network platforms already associated with the user, and in particular with the user's email address, for example, may be queried and associated with the user of the present invention.

Once associated with the present invention, a registered user may follow any number of selected domain names. The user may also receive reports providing information about the followed web site(s), which may further include information about related websites and the interactions between third party users and the related websites. Similarly, a user may follow users within the system and may be provided information about that and other users' internet activity.

As illustrated in FIG. 4, for example, a user who is following at least one additional user may be provided information related to what web site(s) were visited, the duration of each visit, the content accessed, the relation between the visited websites (and to the bookmarked web sites of the following or followed user), and/or the content available or bookmarked from the internet. A user may refine such information by limiting the presented information to various keywords matches, for example.

A user may also claim ownership of a domain through a validation process administered through the present invention, and may thereby gain access to a data or additional data related thereto. For example, domain owners may provide trademark and/or keyword data related to branding for inclusion with a user's alert data. However, some alert data may only be provided to the domain owner.

As described previously herein, a social bookmarklet or browser add-on may allow a user to reach a marked web page from any web browser in any web device (computer, tablet, smart phone, etc). The present invention may, for example, cause a popup window to display information having at least basic domain information related to a current web page. The same window may also provide information related to the Like, Share, and/or Follow features discussed herein, and may trigger social discovery data from a current web page, such as via the backend engine through to other users. As such, the present invention may provide a portable aspect, such as a widget, that may provide the data and inventive elements for users as discussed herein. Further, a unification of followed page data may be thereby provided.

Figures 5, 6:
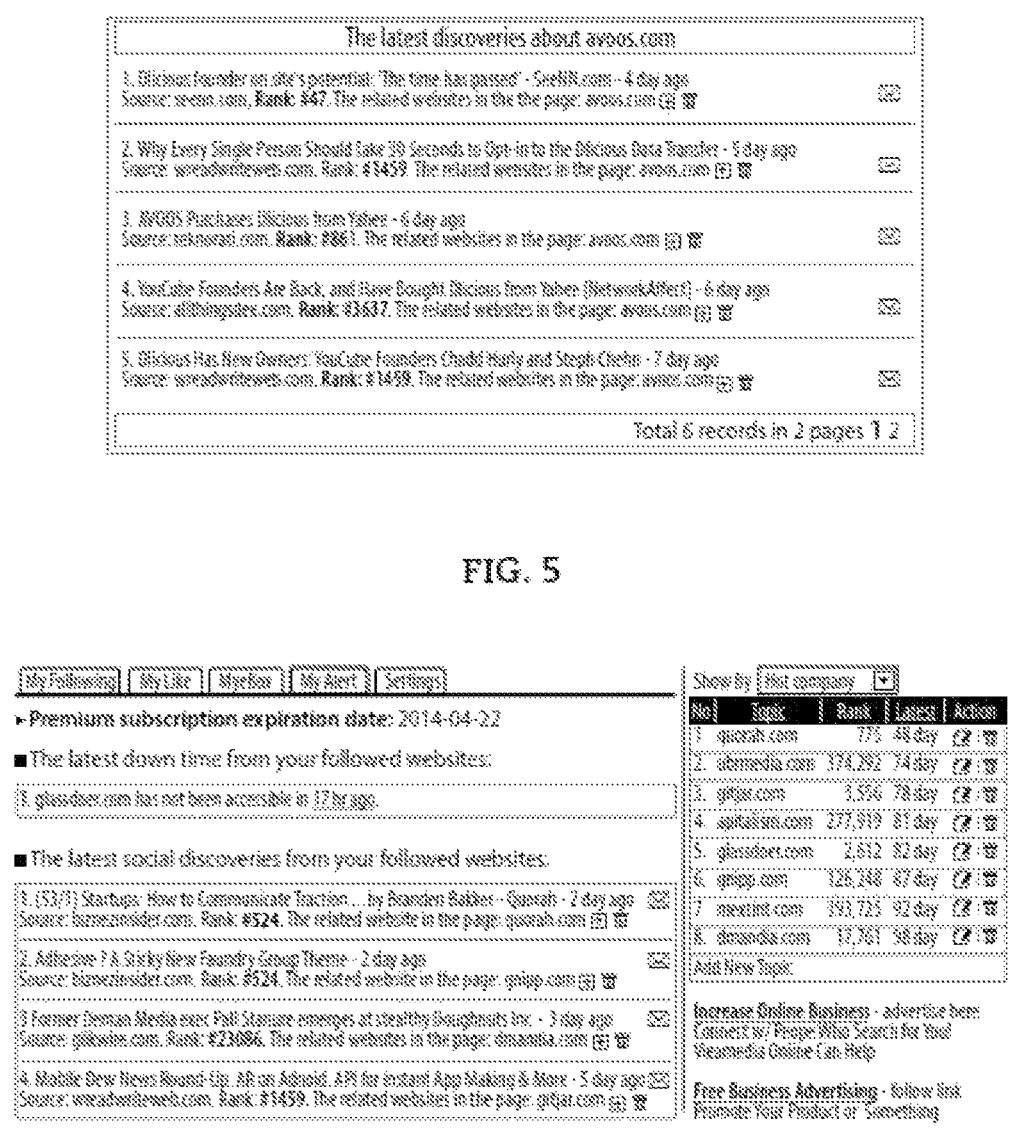

As illustrated in FIG. 5, social discovery from a web page may be facilitated through the filtering of web page content and/or with the use of business intelligence logic to connect the web page information to the related domain. For example, the social discovery functionality of the present invention may allow a web page to contain a web link whose display text has the domain name and link to such domain, which may be provided to the user as related to the user's metrics whether such metrics are inputted by the user or calculated by the present invention based on the user's internet activity.

Social discovery data for domains may be represented using keywords indicating business intelligence rules. For example, a user may follow a keyword instead of a domain name, and in such a case the present invention may use domain information data to get the most matched domain list for that keyword. By way of example, the keyword "spyware" may be linked to one set of domains that have the most high valuation with "spyware" in their respective domain information data (i.e., in their respective domain name, title, description, keywords, etc.). The social discovery data for such keyword may then be converted to obtaining social discovery for the indicated domain list.

In a further exemplary embodiment illustrated in FIG. 6, a user may compile a certain subset of Check gathered information to determine whether a particular website meets the criteria the user has set, such as, for example, the website's popularity or overall access safety. Such information may include, for example, the topics covered by the website, the name of the website, the ranking provided by correlating third party usage, the number or ranking with respect to followers or favorite markers, a latest news posting, a social network posting related to the website, and/or the time between visits to the website by the user or a third party associated with the user, such as in the user's social network. Having such information available to the user may allow the user to make a determination as to the fitness and utility of the target website. Such information may also allow a user to qualify the usefulness of a website without ever having actually landed on or been availed to the direct content of the particular website.

A user may also allow certain third party posts about particular websites to be displayed in the user's access panel. Such posts may provide a social network wherein the user may access opinion and content offered by the poster about the website of interest. Although such information may be included in the overall ranking associated with the website of interest, third party posts may include more detailed information and may allow the user to make a more refined decision as to the quality of the web site.

For example, a commenting user may provide a link to the web site being commented upon an may include a statement form original authorship or copy and paste some prior created content—whether directly from the web site being commented on or related content from a third party source. In any event, the present invention may also associate with the post information related to the web site, such as, for example, the ranking of the web site and an indication of when the post was created.

As further illustrated in FIG. 6, an alert may be based on user grouped domains to present the latest down time data and latest social discovery data. Similarly, an alert may send an email once a day to a domain user for latest social discovery data based on user followed domains and may send instant communications to a domain user when detected down time based on used followed domains.

Figure 7:
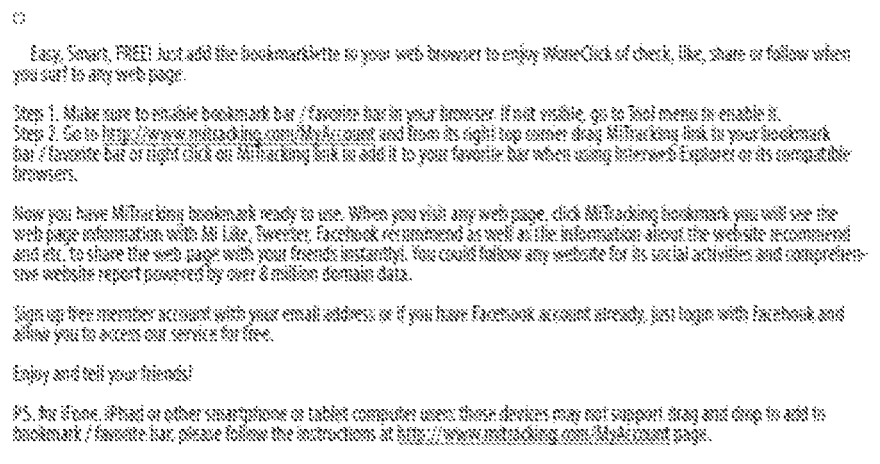

Finally, FIG. 7 is an illustration of the following of a domain (symantec.com in this case), and the obtaining of social discovery data and domain information related thereto. This information may be shared, in accordance with the present invention, such as by email, with other users who may read the social discovery data and elect to also follow the domain. Thereby, the present invention provides viral marketing of the domain. Further, in this exemplary embodiment, the social discovery data may reveal the discovery by the domain of a security flaw and data leak by a third party website, and multiple media websites with a link to the domain. Thus, the story may be cached by the backend and linked to the domain.

The present invention, as discussed herein, may also provide for social network stream discovery by providing a means for accessing streaming data from social networks. For example, each day, about 200 M tweets occur and the company holding the data associated with those tweets may not release data associated therewith and/or may release very little, such as about 1% streaming data (2 M per) to anyone, for example. To access more information, for example, permission must be obtained from the company (such as Twitter). The present invention reads such social stream (such as Twitter's streaming data) and mines for data only associated with a web link. This allows for a filtered and controlled amount of data collected. For example, about 15% of Tweets have link embedded, e.g., photos, web page, etc.

Data collected in this way may result in, for example, 300,000 tweets having a weblink. Although usually a shorten version of the page specific address, by obtaining a sufficient portion of the URL, the present invention may determine the domain associated with the link. Such information may be added to a library associated with the present invention, such a social domain discovery database. The gathered information may be rich in information and may allow the present invention to determine, for example, the number of Tweets having embed YouTube links. Similarly, the information may allow a user to determine the popularity of certain Tweets, e.g., how many followers. In a similar fashion, certain activities may be tracked and measured. For example, if a celebrity, such as Kim Kardashian, for example, tweets a specific URL, a measurable change to that the URL may be detected.

To prevent the collection of too much information and/or to make the usefulness of the collected information more useful, at least one filter may be employed to retain a certain level of links in a defined time range. For example, the 100 "most popular" Tweet links, by follower, for example, may be retained every 24 hours (i.e. if someone with 1 M followers Tweets, that is more imported than someone with 100 followers). Popularity may also be based on other social network feeds, such as, for example, Facebook, and may be supported, at least in part, by metrics from providers such as Google.

As described above, the monitoring of social media streams may allow the present invention to detect spam or other suspicious and/or malicious web links. Such monitoring may occur in any of the media streams discussed herein such as, for example, a photo social network, a messaging social network based, at least in part, on event based occurrences, and social campaign networks, where advertising may be provided by an event model to a channel for dynamic ads contents and directory. A channel may be associated with an event (profile event or other events) and may be assigned to multiple channels.

For example, type XI or 新华图库, that's different channel name assign to same event, may be searched/used by a user. It will be same as website with domains, in our platform user will apply Channel (with time expiration). www.cybeye.com/channel or search channel in apps or website to find/promote specific events. Event is not really traditional meaning of time based. It could be associated time and/or no time limit at all. An event may consist of at least one of a title, location, time, followers, type and contents, for example. A special type of event may be called a "profile event," which may be the same as a current social network user based profile data.

Figure 9:
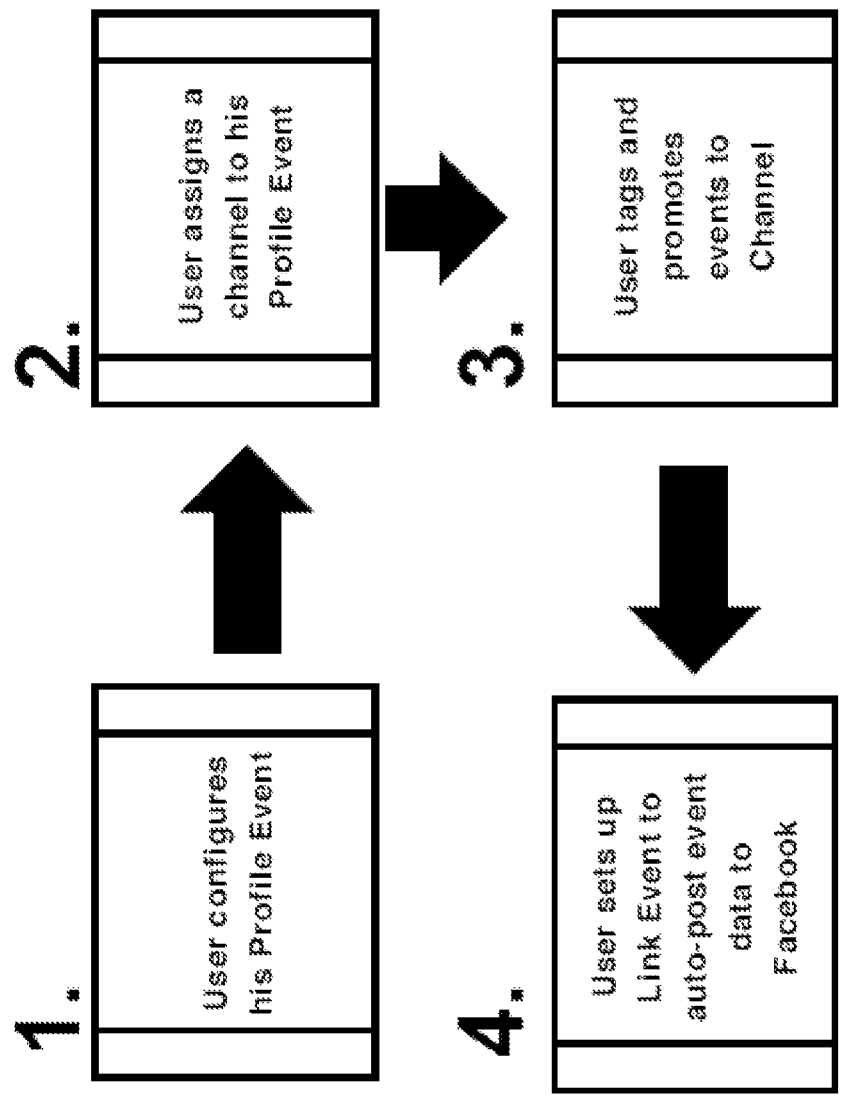
FIG. 9 is an illustration of aspects of the present invention.
Figure 10:
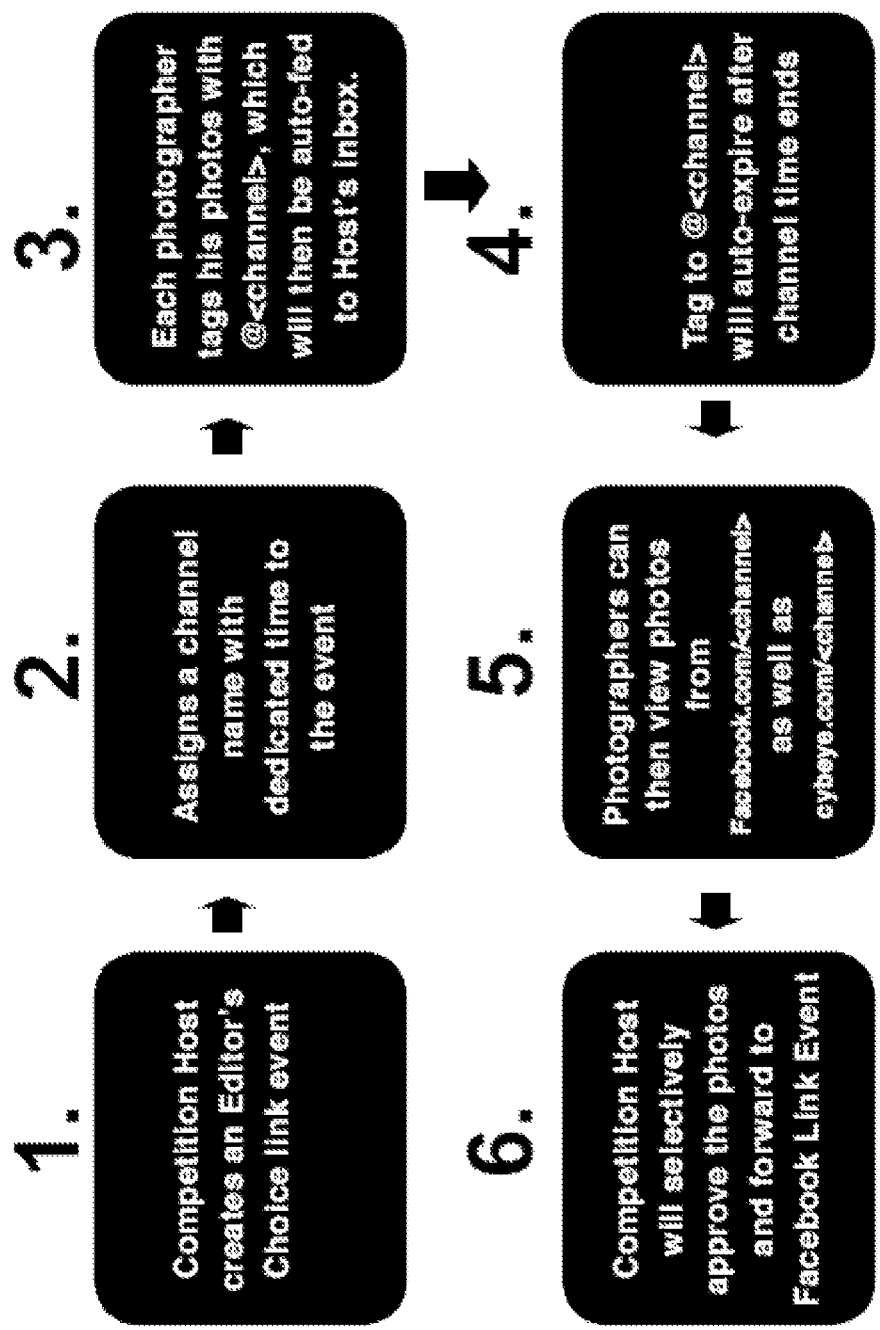
FIG. 10 is an illustration of aspects of the present invention.
Figure 11:
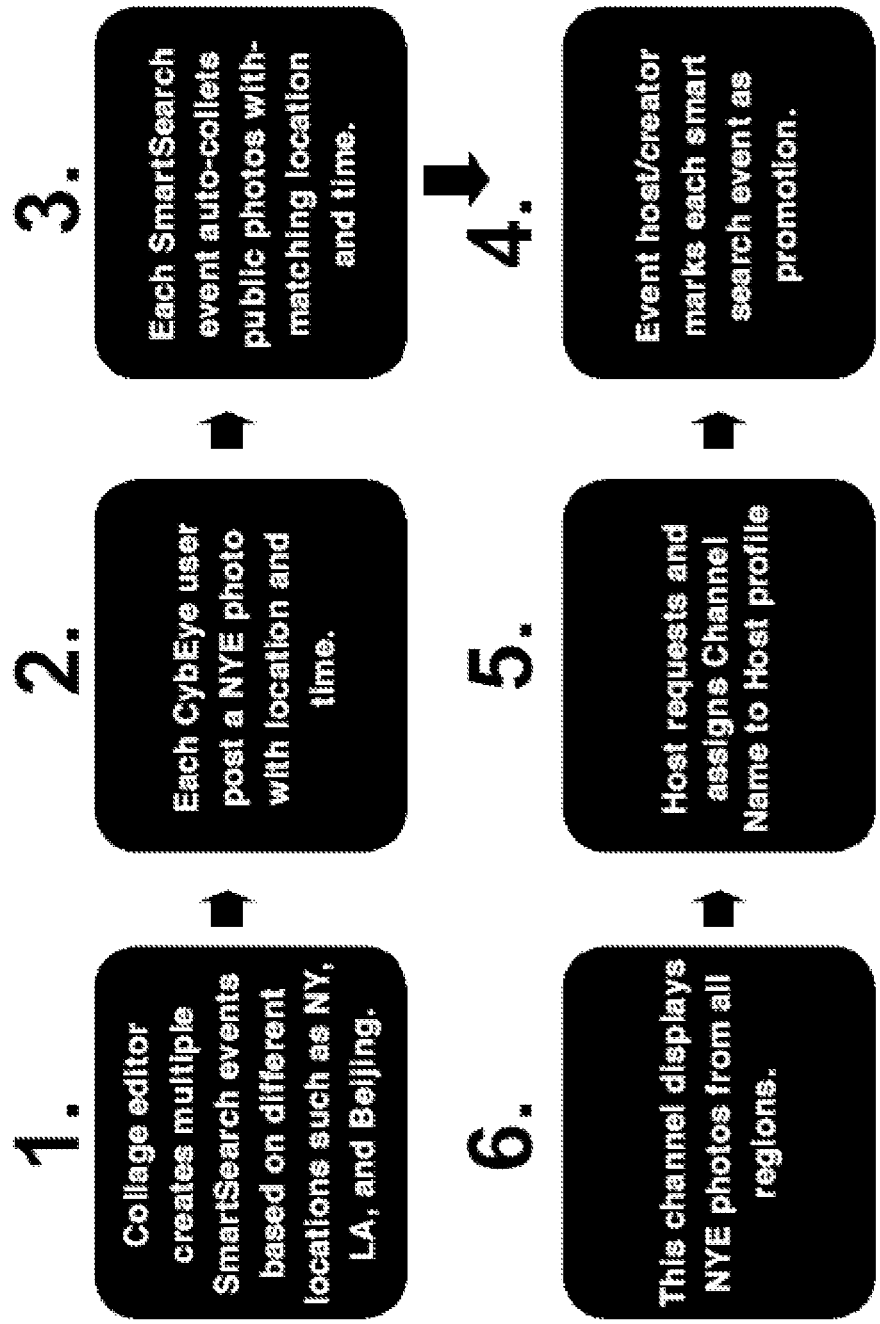
FIG. 11 is an illustration of aspects of the present invention.
Figure 12:
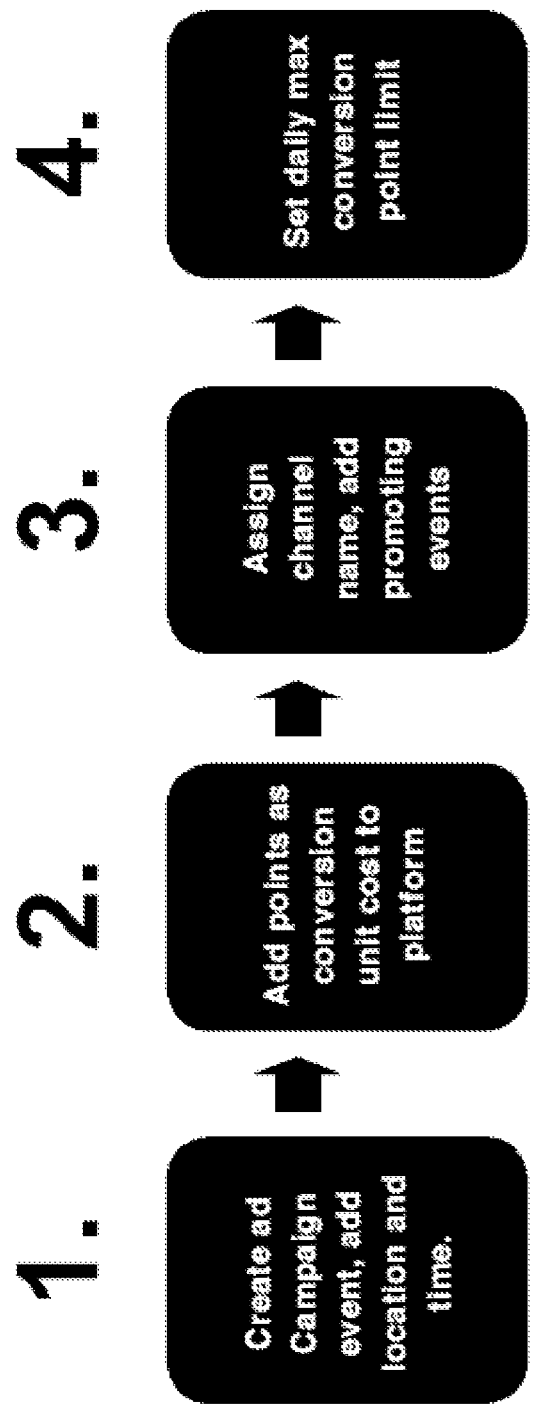
FIG. 12 is an illustration of aspects of the present invention.

Additionally, as illustrated from FIG. 9, the present invention may provide at least one event which may include a type (profile, mobile device, link, domain, and/or user data), time, a location, and/or content (photo(s), communications, map(s)). An event may be on a one-to-one relationship with a channel and/or another event. An event profile, however, may be associated with a plurality of channels and or other events. As noted herein, a channel may be time-dependent and may expire and/or become inaccessible by at least one user after a defined period of time has passed.

Events may provide the ability to add data to a channel, for example, while off line, and may have the ability to associate third party platforms when an internet connection is resumed. Tagging of event associated data may allow for the autofeeding of information to a channel recipient. Tagged content may allow for the matching of tags for delivery confirmation and may allow a user to keyword search content within the system. Tagging of an event, for example, may automatically tag all information associated with the event. As illustrated in FIGS. 9-12, a user may create and assign channel usage and may allow for the distribution of certain content within the system.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A system for providing a domain social network, comprising:
   a first aspect of a backend engine, comprising computing code executed by at least one server for interconnecting Internet node points with at least first domains owned by ones of the Internet node points;
   a second aspect of the backend engine, comprising computing code executed by at least one server for interconnecting others of the Internet node points with at least second domains of interest to the others of the Internet node points;
   wherein the backend engine further obtains dynamic data regarding at least the first and second domains;
   a portable front end configured to receive the dynamic data from the backend engine, and receive forwarded ones of the dynamic data from the backend via at least one of a web service and an email service; and
   wherein the dynamic data further indicates filtering data to protect data of the first and second domains, and protect at least the others of the Internet node points users by identifying low quality or malicious data of the first and second domains;
   wherein the dynamic data is filtered based on the identified low quality or malicious data of the first and second domains; and
   wherein the portable front end is further configured to display the filtered dynamic data of the first and second domains to a non-virtual entity via the portable front end on an output display device;
   wherein the portable front end is further configured to receive data entry from the non-virtual entity;
   wherein the data entry comprises at least one or more of the following: follow a domain, check a domain, and like a domain.

2. The system of claim 1, wherein the web service comprises at least one social media service.

3. The system of claim 1, wherein the at least one user metric comprises a listing of user visited URLs.

4. The system of claim 1, wherein the user is provided at least one web page comprising at least one URL link comprising at least a partial display of text having the domain name of the at least one URL.

5. The system of claim 1, wherein the dynamic data is selectively added to at least one database.

6. The system of claim 1, wherein the dynamic data comprises information associated with the number of URLs located in at least one communications stream.

7. The system of claim 6, wherein at least one frequency score related to the number of URLs is calculated.

* * * * *